United States Patent
Nakamura et al.

(10) Patent No.: US 11,479,674 B2
(45) Date of Patent: Oct. 25, 2022

(54) COMPOSITE PARTICLES COMPRISING TiN POWDER AND METHOD FOR PRODUCING THE COMPOSITE PARTICLES

(71) Applicant: NISSHIN ENGINEERING INC., Tokyo (JP)

(72) Inventors: Keitaroh Nakamura, Fujimino (JP); Daisuke Sato, Fujimino (JP)

(73) Assignee: NISSHIN ENGINEERING INC., Tokyo (JP)

( * ) Notice: Subject to any disclaimer, the term of this patent is extended or adjusted under 35 U.S.C. 154(b) by 20 days.

(21) Appl. No.: 16/982,481

(22) PCT Filed: Mar. 11, 2019

(86) PCT No.: PCT/JP2019/009642
§ 371 (c)(1),
(2) Date: Sep. 18, 2020

(87) PCT Pub. No.: WO2019/181600
PCT Pub. Date: Sep. 26, 2019

(65) Prior Publication Data
US 2021/0017391 A1  Jan. 21, 2021

(30) Foreign Application Priority Data
Mar. 23, 2018 (JP) .............................. JP2018-056031

(51) Int. Cl.
*C09C 1/36* (2006.01)
*C01G 23/00* (2006.01)
(Continued)

(52) U.S. Cl.
CPC .............. *C09C 1/36* (2013.01); *C01G 23/002* (2013.01); *C01G 33/006* (2013.01); *C01G 37/006* (2013.01); *C01P 2004/80* (2013.01)

(58) Field of Classification Search
CPC .. C01G 23/002; C01G 33/006; C01G 37/006; B22F 1/025; B22F 7/008; B22F 2302/20; C22C 1/10; C22C 29/16
(Continued)

(56) References Cited

U.S. PATENT DOCUMENTS

| | | | | |
|---|---|---|---|---|
| 3,322,515 | A | * | 5/1967 | Dittrich ...................... C23C 4/00 149/5 |
| 2004/0131894 | A1 | * | 7/2004 | Erdemir .................. C23C 30/00 428/698 |
| 2014/0302323 | A1 | | 10/2014 | Disalvo et al. |

FOREIGN PATENT DOCUMENTS

| | | |
|---|---|---|
| CN | 101265109 A | 9/2008 |
| CN | 101289222 A | 10/2008 |

(Continued)

OTHER PUBLICATIONS

Zalite et al., Fine Transition Metals Carbonitride Powders for Preparation of Cermets, Interface Controlled Materials. Edited by M. Ruhle and H. Gleiter. Copyright 2000 Wiley-VCH Verlag GmbH, Weinheim. ISBN: 3-527-30191-7 (Year: 2000).*

(Continued)

*Primary Examiner* — Hoa (Holly) Le
(74) *Attorney, Agent, or Firm* — Muncy, Geissler, Olds & Lowe, P.C.

(57) ABSTRACT

Provided are: composite particles having excellent oxidation resistance; and a method for producing composite particles. The composite particles are obtained by forming a composite of TiN and at least one of Al, Cr, and Nb. In the method for producing composite particles, a titanium powder and a powder of at least one of Al, Cr, and Nb are used as raw material powders and composite particles are produced using a gas phase method.

5 Claims, 2 Drawing Sheets

(51) Int. Cl.
   *C01G 33/00* (2006.01)
   *C01G 37/00* (2006.01)
(58) Field of Classification Search
   USPC .... 423/61, 71, 81, 115; 75/346, 10.1, 10.18, 75/10.19, 10.21, 10.26, 10.39
   See application file for complete search history.

(56) References Cited

FOREIGN PATENT DOCUMENTS

| JP | 5-78107 A | 3/1993 |
|----|-----------|--------|
| JP | 2015-227282 A | 12/2015 |

OTHER PUBLICATIONS

Brancho, Compositionally Complex Titanium Niobium Oxynitride Materials for Solar-Driven Photochemistry, PhD Thesis (Chemistry), University of Michigan, 2017 (Year: 2017).*

Drygas et al., Composite Nitride Nanoceramics in the System Titanium Nitride (TiN)-Aluminum Nitride (AlN) through High Pressure and High Temperature Sintering of Synthesis-Mixed Nanocrystalline Powders, Materials 2021, 14, 588. https://doi.org/10.3390/ma14030588 (Year: 2021).*

Bhaduri et al., Electro Discharge Machining of Titanium Nitride-Aluminium Oxide Composite for Optimum Process Criterial Yield, Materials and Manufacturing Processes, 24: 1312-1320, 2009I DOI: 10.1080/10426910902996987 (Year: 2009).*

Yang et al., Nano-structured ternary niobium titanium nitrides as durable non-carbon supports for oxygen reduction reaction, Chem. Commun., 2013, 49, 10853 I DOI: 10.1039/c3cc45732j (Year: 2013).*

Venkateswarlu et al., Synthesis of TiN Reinforced Aluminium Metal Matrix Composites Through Microwave Sintering, JMEPEG (2010) 19:231-236 I DOI: 10.1007/s11665-009-9458-y (Year: 2010).*

A. Chennakesava Reddy, Effect of Porosity Formation during Synthesis of Cast AA4015/Titanium Nitride Particle-Metal Matrix Composites, 5th National Conference on Materials and Manufacturing Processes, Hyderabad, Andhra Pradesh, India, Jun. 2006 (Year: 2006).*

Fischer et al., Synthesis of Ternary Metal Nitride Nanoparticles Using Mesoporous Carbon Nitride as Reactive Template, ACS NANO, vol. 2 ■ No. 12 ■ 2489-2496 ■ 2008 I DOI: 10.1021/nn800503a (Year: 2008).*

Ogino, Y. et al., "Synthesis of TiN and Synthesis of TiN and (Ti, Al)N Powders by Mechanical Alloying in Nitrogen gas", Scripta Metallurgica et Material IA, 1993, pp. 967-971, vol. 28, No. 8.

Jin, Xihai et al., "Preparation of nanostructured Cr 1-xTixN ceramics by spark plasma sintering and their properties", Acta Meterialia, 2006, 54, pp. 4035-4041.

* cited by examiner

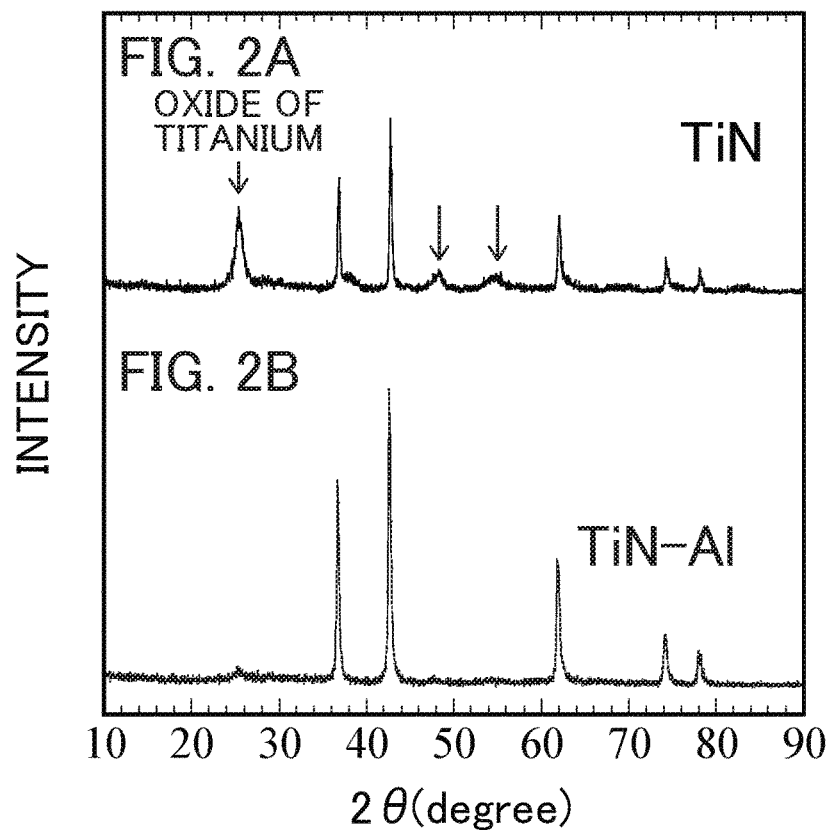
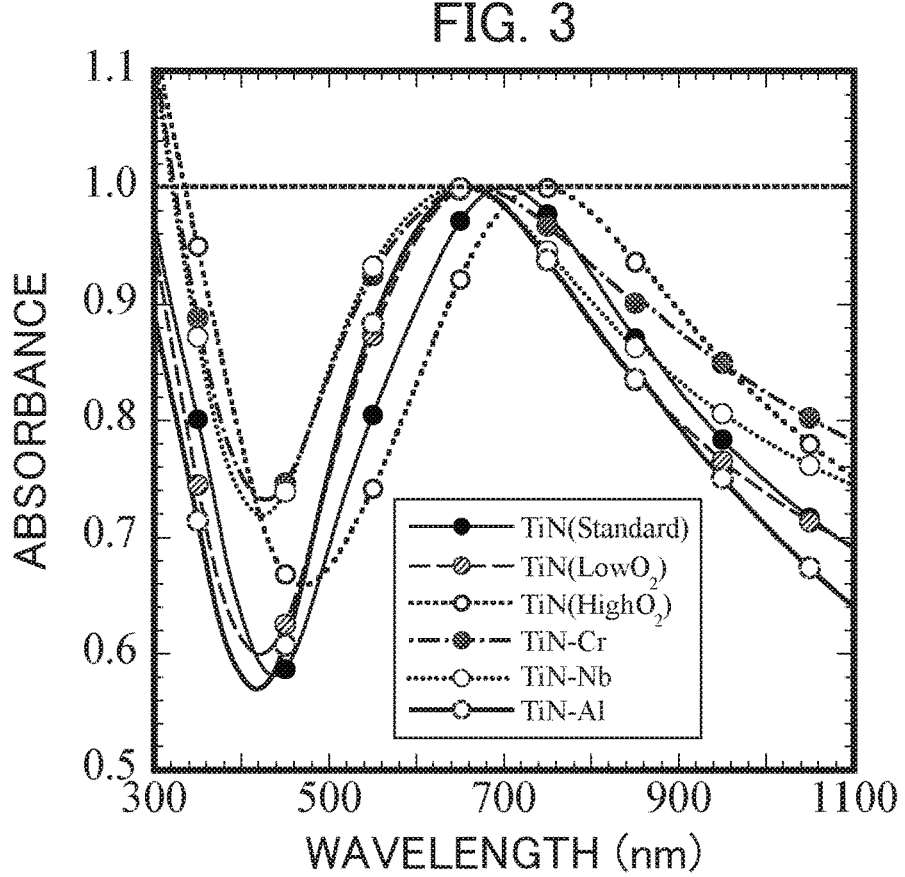

COMPOSITE PARTICLES COMPRISING TIN POWDER AND METHOD FOR PRODUCING THE COMPOSITE PARTICLES

TECHNICAL FIELD

The present invention relates to composite particles of titanium nitride and a method of producing the composite particles, particularly to composite particles having excellent oxidation resistance and a method of producing the composite particles.

BACKGROUND ART

At present, various types of fine particles are used in various applications. For instance, fine particles such as metal fine particles, oxide fine particles, nitride fine particles and carbide fine particles have been used in electrical insulation materials for various electrical insulation parts, cutting tools, materials for machining tools, functional materials for sensors, sintered materials, electrode materials for fuel cells, and catalysts.

Patent Literature 1 describes black composite particles having high light-shielding performance suitable as a black component such as a black matrix in a color filter. The black composite particles are black composite particles comprising titanium nitride particles and metal fine particles and represented by the composition formula: $TiN_xO_y \cdot zX$. In the composition formula, Ti is a titanium atom, N is a nitrogen atom, O is an oxygen atom, and X is a metal atom. x is a number greater than 0 and less than 2, y is a number not less than 0 and less than 2, and z is a number greater than 0 and less than 10.

CITATION LIST

Patent Literature

Patent Literature 1: JP 2015-227282 A

SUMMARY OF INVENTION

Technical Problems

Conventionally, black composite particles composed of titanium nitride particles and metal fine particles have been proposed as in Patent Literature 1 described above. At present, however, there are demands for broadening of a range of applications, addition of other functions, and the like. For instance, oxidation resistance is being required.

An object of the present invention is to provide composite particles having excellent oxidation resistance and a method of producing the composite particles.

Solution to Problems

In order to attain the foregoing object, the present invention provides composite particles in which TiN is combined with at least one of Al, Cr and Nb.

When the TiN is combined with the Al, a content of the Al is preferably 0.1 to 20 mass %.

When the TiN is combined with the Cr, a content of the Cr is preferably 0.1 to 20 mass %.

When the TiN is combined with the Nb, a content of the Nb is preferably 0.1 to 20 mass %.

The present invention provides a method of producing composite particles in which TiN is combined with at least one of Al, Cr and Nb, wherein the composite particles are produced using powder of titanium and powder of at least one of Al, Cr and Nb as feedstock by means of a gas-phase process.

Preferably, the gas-phase process is a thermal plasma process, a flame process, an arc plasma process, a microwave heating process or a pulsed wire process.

Preferably, the thermal plasma process involves a step of supplying carrier gas having the feedstock dispersed therein to a thermal plasma flame and a step of supplying cooling gas to a terminating portion of the thermal plasma flame to thereby produce the composite particles.

Preferably, the thermal plasma flame is derived from at least one of argon gas and nitrogen gas.

Advantageous Effects of Invention

The present invention makes it possible to provide composite particles having excellent oxidation resistance.

BRIEF DESCRIPTION OF DRAWINGS

FIG. 2A is a graph showing an analysis result of a crystal structure of titanium nitride as obtained by X-ray diffractometry, and FIG. 2B is a graph showing an analysis result of a crystal structure of composite particles of titanium nitride and aluminum as obtained by X-ray diffractometry.

FIG. 3 is a graph showing absorbances of composite particles and titanium nitride particles.

DESCRIPTION OF EMBODIMENTS

Figure 1:
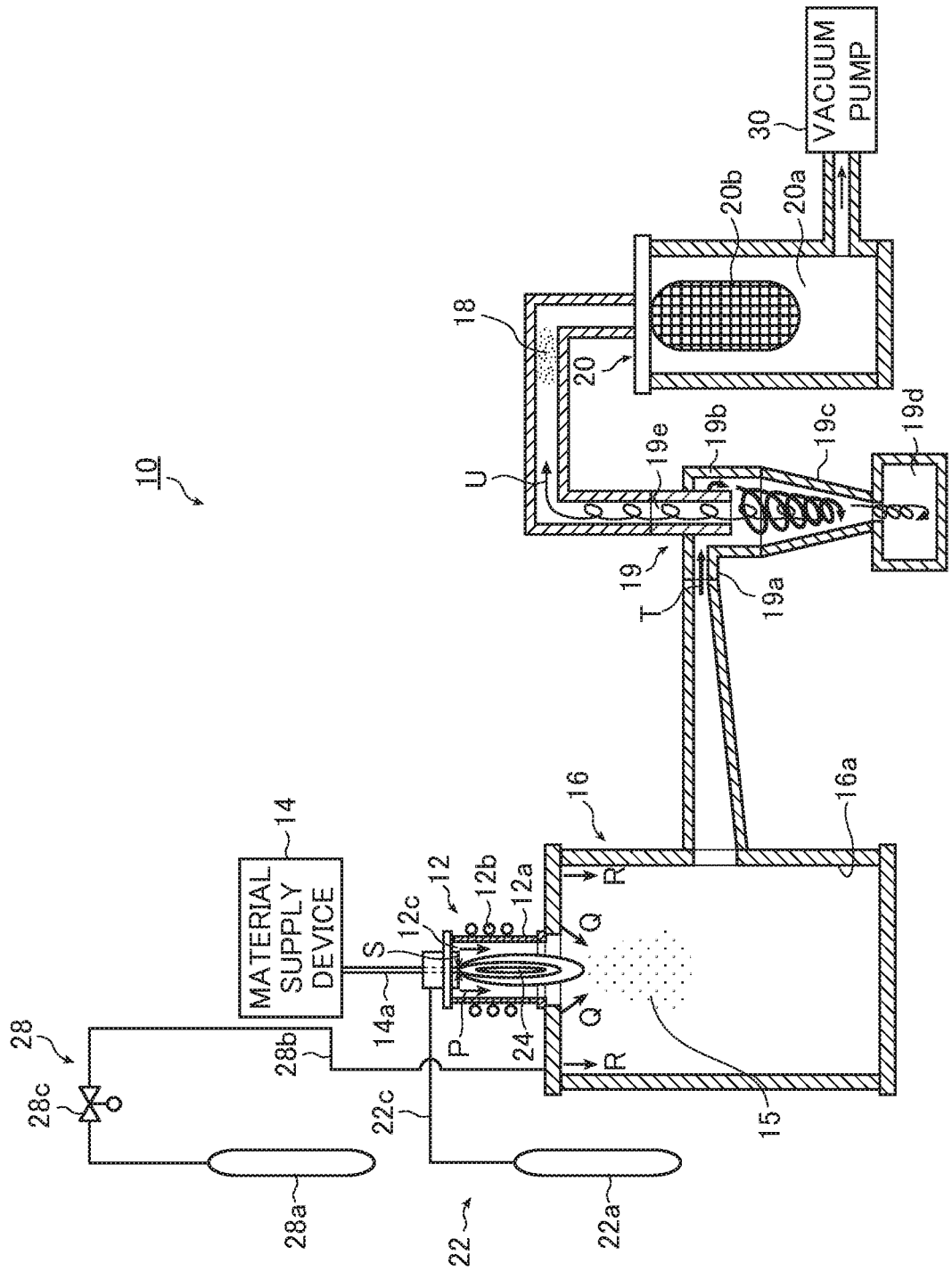
FIG. 1 is a schematic view showing an example of a fine particle production apparatus that is used in a method of producing composite particles according to an embodiment of the invention.

On the following pages, composite particles and a method of producing the composite particles according to the invention are described in detail with reference to preferred embodiments shown in the accompanying drawings.

FIG. 1 is a schematic view showing an example of a fine particle production apparatus that is used in the method of producing composite particles according to an embodiment of the invention.

A fine particle production apparatus 10 (hereinafter referred to simply as "production apparatus 10") shown in FIG. 1 is used to produce composite particles.

The composite particles are particles obtained by combining TiN with at least one of Al, Cr and Nb.

The composite particles refer not to particles in which various types of nitride particles such as TiN, AlN, CrN and NbN are mixed and individually present but to nitride particles in which TiN and at least one of Al, Cr and Nb are contained in each particle. The forms of Al, Cr and Nb in the composite particles are not particularly limited, and Al, Cr and Nb may be in the form of not only a simple metal but also compounds such as a nitride, an oxide, an oxynitride, a non-stoichiometric oxide and a non-stoichiometric nitride.

The composite particles are those called nanoparticles and may have a particle size of 1 to 100 nm. The particle size is the average particle size measured using the BET method. The composite particles are, for example, produced by a production method described later and are obtained not in a dispersed form in a solvent or the like but in a particulate form.

The production apparatus 10 includes a plasma torch 12 generating thermal plasma, a material supply device 14 supplying feedstock of the composite particles into the plasma torch 12, a chamber 16 serving as a cooling tank for use in producing primary fine particles 15 of the composite particles, a cyclone 19 removing, from the produced primary fine particles 15 of the composite particles, coarse particles having a particle size equal to or larger than an arbitrarily specified particle size, and a collecting section 20 collecting secondary fine particles 18 of the composite particles having a desired particle size as obtained by classification by the cyclone 19.

Various devices in, for example, JP 2007-138287 A may be used for the material supply device 14, the chamber 16, the cyclone 19 and the collecting section 20. The primary fine particles 15 of the composite particles are also simply called primary fine particles 15.

In this embodiment, for example, titanium powder and powder of at least one of Al, Cr and Nb are used as the feedstock in production of the composite particles.

The average particle size of the feedstock is appropriately set to allow easy evaporation of the feedstock in a thermal plasma flame and is, for example, up to 100 μm, preferably up to 10 μm and more preferably up to 5 μm.

The plasma torch 12 is constituted of a quartz tube 12a and a coil 12b for high frequency oscillation surrounding the outside of the quartz tube. A supply tube 14a to be described later which is for supplying the feedstock of the composite particles into the plasma torch 12 is provided on the top of the plasma torch 12 at the central part thereof. A plasma gas supply port 12c is formed in the peripheral portion of the supply tube 14a (on the same circumference). The plasma gas supply port 12c is in a ring shape.

A plasma gas supply source 22 is configured to supply plasma gas into the plasma torch 12 and for instance has a gas supply section 22a. The gas supply section 22a is connected to the plasma gas supply port 12c through piping 22c. Although not shown, the gas supply section 22a is provided with a supply amount adjuster such as a valve for adjusting the supply amount. Plasma gas is supplied from the plasma gas supply source 22 into the plasma torch 12 through the plasma gas supply port 12c of ring shape in the direction indicated by arrow P and the direction indicated by arrow S.

For example, mixed gas of argon gas and nitrogen gas is used as the plasma gas. The thermal plasma flame is derived from at least one of argon gas and nitrogen gas.

At least one of argon gas and nitrogen gas is stored in the gas supply section 22a. At least one of argon gas and nitrogen gas is supplied from the gas supply section 22a of the plasma gas supply source 22 into the plasma torch 12 in the direction indicated by arrow P and the direction indicated by arrow S after passing through the piping 22c and then the plasma gas supply port 12c. At least one of argon gas and nitrogen gas may be solely supplied in the direction indicated by arrow P.

When a high frequency voltage is applied to the coil 12b for high frequency oscillation, a thermal plasma flame 24 is generated in the plasma torch 12.

It is necessary for the thermal plasma flame 24 to have a higher temperature than the boiling point of the feedstock. A higher temperature of the thermal plasma flame 24 is more preferred because the feedstock is more easily converted into a gas phase state; however, there is no particular limitation on the temperature. For instance, the thermal plasma flame 24 may have a temperature of 6,000° C., and in theory, the temperature is deemed to reach around 10,000° C.

The ambient pressure inside the plasma torch 12 is preferably up to atmospheric pressure. For the atmosphere at a pressure up to atmospheric pressure, the pressure is not particularly limited and is, for example, in the range of 0.5 to 100 kPa.

While, for example, at least one of argon gas and nitrogen gas is used as the plasma gas, the invention is not limited thereto, and use may be made of the combination of at least one of argon gas and nitrogen gas with helium gas or the combination of at least one of argon gas and nitrogen gas with hydrogen gas.

The periphery of the quartz tube 12a is surrounded by a concentrically formed tube (not shown), and cooling water is circulated between this tube and the quartz tube 12a to cool the quartz tube 12a with the water, thereby preventing the quartz tube 12a from having an excessively high temperature due to the thermal plasma flame 24 generated in the plasma torch 12.

The material supply device 14 is connected to the top of the plasma torch 12 through the supply tube 14a. The material supply device 14 is configured to supply the feedstock in a powdery form into the thermal plasma flame 24 in the plasma torch 12, for example.

For example, the device disclosed in JP 2007-138287 A may be used as the material supply device 14 which supplies the feedstock in a powdery form. In this case, the material supply device 14 includes, for example, a storage tank (not shown) storing the feedstock, a screw feeder (not shown) transporting the feedstock in a fixed amount, a dispersion section (not shown) dispersing the feedstock transported by the screw feeder to convert it into the form of primary particles before the feedstock is finally sprayed, and a carrier gas supply source (not shown).

Together with a carrier gas to which a push-out pressure is applied from the carrier gas supply source, the feedstock is supplied into the thermal plasma flame 24 in the plasma torch 12 through the supply tube 14a.

The configuration of the material supply device 14 is not particularly limited as long as the device can prevent the feedstock from agglomerating, thus making it possible to spray the feedstock in the plasma torch 12 with the dispersed state maintained. Inert gas such as argon gas is used as the carrier gas, for example. The flow rate of the carrier gas can be controlled using, for instance, a flowmeter such as a float type flowmeter. The flow rate value of the carrier gas is indicated by a reading on the flowmeter.

The chamber 16 is provided below the plasma torch 12 in a continuous manner, and a gas supply device 28 is connected to the chamber 16. The primary fine particles 15 of the composite particles are produced in the chamber 16. The chamber 16 also serves as a cooling tank.

The gas supply device 28 is configured to supply cooling gas into the chamber 16. The gas supply device 28 includes a gas supply source 28a and piping 28b, and further includes a pressure application means (not shown) such as a compressor or a blower which applies push-out pressure to the cooling gas to be supplied into the chamber 16. The gas supply device 28 is also provided with a pressure control valve 28c which controls the amount of gas supplied from the gas supply source 28a. For instance, at least one of argon gas and nitrogen gas is stored in the gas supply source 28a. The cooling gas is at least one of argon gas and nitrogen gas.

For the plasma gas, at least one of argon gas and nitrogen gas is used as described above.

Nitrogen gas needs to be included in either one of the plasma gas and the cooling gas, and is preferably included in the plasma gas.

The gas supply device 28 supplies at least one of argon gas and nitrogen gas as the cooling gas at, for example, 45 degrees in the direction of arrow Q toward a tail portion of the thermal plasma flame 24, i.e., the end of the thermal plasma flame 24 on the opposite side from the plasma gas supply port 12*c*, that is, a terminating portion of the thermal plasma flame 24, and also supplies the cooling gas from above to below along an inner wall 16*a* of the chamber 16, that is, in the direction of arrow R shown in FIG. 1.

The cooling gas supplied from the gas supply device 28 into the chamber 16 rapidly cools the feedstock having been converted to a gas phase state through the thermal plasma flame 24, thereby obtaining the primary fine particles 15 of the composite particles. Besides, the cooling gas has additional functions such as contribution to classification of the primary fine particles 15 in the cyclone 19.

When the primary fine particles 15 of the composite particles having just been produced collide with each other to form agglomerates, this causes nonuniform particle size, resulting in lower quality. However, dilution of the primary fine particles 15 with the cooling gas supplied in the direction of arrow Q toward the tail portion (terminating portion) of the thermal plasma flame prevents the fine particles from colliding with each other to agglomerate together.

In addition, the cooling gas supplied in the direction of arrow R prevents the primary fine particles 15 from adhering to the inner wall 16*a* of the chamber 16 in the process of collecting the primary fine particles 15, whereby the yield of the produced primary fine particles 15 is improved.

As shown in FIG. 1, the cyclone 19 is provided to the chamber 16 to classify the primary fine particles 15 of the composite particles based on a desired particle size. The cyclone 19 includes an inlet tube 19*a* which supplies the primary fine particles 15 from the chamber 16, a cylindrical outer tube 19*b* connected to the inlet tube 19*a* and positioned at an upper portion of the cyclone 19, a truncated conical part 19*c* continuing downward from the bottom of the outer tube 19*b* and having a gradually decreasing diameter, a coarse particle collecting chamber 19*d* connected to the bottom of the truncated conical part 19*c* for collecting coarse particles having a particle size equal to or larger than the above-mentioned desired particle size, and an inner tube 19*e* connected to the collecting section 20 to be detailed later and projecting from the outer tube 19*b*.

A gas stream containing the primary fine particles 15 is blown from the inlet tube 19*a* of the cyclone 19 to flow along the inner peripheral wall of the outer tube 19*b*, and accordingly, this gas stream flows in the direction from the inner peripheral wall of the outer tube 19*b* toward the truncated conical part 19*c* as indicated by arrow T in FIG. 1, thus forming a downward swirling stream.

When the downward swirling stream is inverted to an upward stream, coarse particles cannot follow the upward stream due to the balance between the centrifugal force and drag, fall down along the lateral surface of the truncated conical part 19*c* and are collected in the coarse particle collecting chamber 19*d*. Fine particles having been affected by the drag more than the centrifugal force are discharged to the outside of the system through the inner tube 19*e* along with the upward stream on the inner wall of the truncated conical part 19*c*.

The apparatus is configured such that a negative pressure (suction force) is exerted from the collecting section 20 to be detailed later through the inner tube 19*e*. Due to the negative pressure (suction force), the composite particles separated from the swirling gas stream are sucked as indicated by arrow U and sent to the collecting section 20 through the inner tube 19*e*.

On the extension of the inner tube 19*e* which is an outlet for the gas stream in the cyclone 19, the collecting section 20 is provided to collect the secondary fine particles (composite particles) 18 having a desired particle size on the order of nanometers. The collecting section 20 includes a collecting chamber 20*a*, a filter 20*b* provided in the collecting chamber 20*a*, and a vacuum pump 30 connected through a pipe provided at a lower portion of the collecting chamber 20*a*. The fine particles delivered from the cyclone 19 are sucked by the vacuum pump 30 to be introduced into the collecting chamber 20*a*, remain on the surface of the filter 20*b*, and are then collected.

It should be noted that the number of cyclones used in the production apparatus 10 is not limited to one and may be two or more.

Next, one example of the method of producing composite particles using the production apparatus 10 above is described below.

First, titanium powder and powder of at least one of Al, Cr and Nb are used as the feedstock of the composite particles. Powders with an average particle size of, for instance, not more than 5 μm are used as the feedstock. The feedstock is put in the material supply device 14.

When titanium powder and Al powder are used as the feedstock, composite particles of titanium nitride and aluminum can be obtained.

When titanium powder and Cr powder are used as the feedstock, composite particles of titanium nitride and chromium can be obtained.

When titanium powder and Nb powder are used as the feedstock, composite particles of titanium nitride and niobium can be obtained.

For example, using at least one of argon gas and nitrogen gas as the plasma gas, a high frequency voltage is applied to the coil 12*b* for high frequency oscillation to generate the thermal plasma flame 24 in the plasma torch 12.

Further, for example, at least one of argon gas and nitrogen gas is supplied as the cooling gas in the direction of arrow Q from the gas supply device 28 to the tail portion of the thermal plasma flame 24, i.e., the terminating portion of the thermal plasma flame 24. At this time, at least one of argon gas and nitrogen gas is supplied as the cooling gas also in the direction of arrow R.

Next, the feedstock is transported with gas, for example, argon gas used as the carrier gas and supplied to the thermal plasma flame 24 in the plasma torch 12 through the supply tube 14*a*. The feedstock supplied is evaporated in the thermal plasma flame 24 to be converted into a gas phase state, reacts with nitrogen to be nitrided, and is rapidly cooled with the cooling gas, thereby obtaining the primary fine particles 15 of the composite particles of titanium nitride.

The primary fine particles 15 of the composite particles thus obtained in the chamber 16 are, together with a gas stream, blown through the inlet tube 19*a* of the cyclone 19 along the inner peripheral wall of the outer tube 19*b*, and this gas stream flows along the inner peripheral wall of the outer tube 19*b* as indicated by arrow T in FIG. 1, thus forming a swirling stream which goes downward. When the downward swirling stream is inverted to an upward stream, coarse particles cannot follow the upward stream due to the balance between the centrifugal force and drag, fall down along the lateral surface of the truncated conical part 19*c* and are collected in the coarse particle collecting chamber 19*d*. Fine particles having been affected by the drag more than the centrifugal force are discharged along the inner wall of the truncated conical part 19c to the outside of the system together with the upward stream on the inner wall.

Due to the negative pressure (suction force) applied by the vacuum pump 30 through the collecting section 20, the discharged secondary fine particles (composite particles) 18 are sucked in the direction indicated by arrow U in FIG. 1 and sent to the collecting section 20 through the inner tube 19e to be collected on the filter 20b of the collecting section 20. The internal pressure of the cyclone 19 at this time is preferably equal to or lower than the atmospheric pressure. For the particle size of the secondary fine particles (composite particles) 18, an arbitrary particle size on the order of nanometers is specified according to the intended purpose.

Thus, the composite particles can be easily and reliably obtained by merely subjecting the feedstock composed of titanium powder and powder of at least one of Al, Cr and Nb to plasma treatment.

Furthermore, the composite particles produced by the method of producing composite particles according to this embodiment have a narrow particle size distribution, in other words, have a uniform particle size, and coarse particles of 1 µm or more are hardly included.

While the primary fine particles of the composite particles are formed using a thermal plasma flame, the primary fine particles of the composite particles may be formed by a gas-phase process. Thus, the method of producing the primary fine particles of the composite particles is not limited to the thermal plasma process using a thermal plasma flame as long as it is the gas-phase process, and may alternatively be one using a flame process, an arc plasma process, a microwave heating process or a pulsed wire process.

The flame process herein is a method of synthesizing composite particles by using a flame as the heat source and putting feedstock in a gas phase or a liquid phase through the flame. In the flame process, the feedstock in a gas or liquid phase state is supplied to flame, and then cooling gas is supplied to the flame to decrease the flame temperature, thus obtaining the primary fine particles 15 of the composite particles.

The feedstock in a gas phase state is, for example, feedstock dispersed in carrier gas as described above. The feedstock in a liquid phase state is feedstock dispersed in a solvent.

For the cooling gas, the same gas as that used for the thermal plasma process described above can be used.

Next, the composite particles are described.

As described above, the composite particles of the invention are those called nanoparticles having a particle size of 1 to 100 nm. The particle size is the average particle size measured using the BET method.

The composite particles of the invention are not present in a dispersed form in a solvent or the like but present alone, as described above. Therefore, there is no particular limitation on the combination of a solvent and the like, and the degree of freedom is high in selection of a solvent.

As described above, the composite particles are particles obtained by combining TiN with at least one of Al, Cr and Nb. When TiN is combined with Al, the Al content is preferably 0.1 to 20 mass %. The Al content falling within the foregoing range leads to excellent oxidation resistance.

When TiN is combined with Cr, the Cr content is preferably 0.1 to 20 mass %. The Cr content falling within the foregoing range leads to excellent oxidation resistance.

When TiN is combined with Nb, the Nb content is preferably 0.1 to 20 mass %. The Nb content falling within the foregoing range leads to excellent oxidation resistance.

The contents (mass %) of the respective elements above can be determined by XRF (X-ray fluorescence spectrometry), and the contents (mass %) of the respective elements are obtained with impurities being removed.

Specifically, in the case of the Al content, the Al content is represented by the percentage by mass of Al when the contents (mass %) of the other elements than Ti and Al are omitted from the contents (mass %) of all the elements measured by XRF (X-ray fluorescence spectrometry) and the total percentage by mass of Ti and Al are defined as 100.

FIG. 2A is a graph showing an analysis result of a crystal structure of titanium nitride as obtained by X-ray diffractometry, and FIG. 2B is a graph showing an analysis result of a crystal structure of composite particles of titanium nitride and aluminum as obtained by X-ray diffractometry. FIGS. 2A and 2B both show analysis results of crystal structures after baking at a temperature of 400° C. for 10 minutes in the air. Arrows in FIG. 2A indicate diffraction peaks of an oxide of titanium.

When FIGS. 2A and 2B are compared, the diffraction pattern of TiN and that of the compound of titanium nitride and aluminum are the same except for the diffraction peaks of an oxide of titanium (indicated by arrows in FIG. 2A) and are different only in intensity.

As compared to TiN, the compound of titanium nitride and aluminum has almost no diffraction peaks of an oxide of titanium in terms of intensity after baking at a temperature of 400° C. for 10 minutes in the air, thus having excellent oxidation resistance.

Also for the color, in TiN after baking at a temperature of 400° C. for 10 minutes in the air, powder changed to a whitish color as a whole with generation of an oxide of titanium, while the compound of titanium nitride and aluminum did not exhibit any change in color. It can be said also from this that the compound of titanium nitride and aluminum can have a higher oxidation onset temperature and is more effective in terms of oxidation resistance than TiN.

Further, the absorbances of the composite particles of titanium nitride were measured. FIG. 3 is a graph showing the absorbances of composite particles and titanium nitride particles.

As shown in FIG. 3, the composite particles of titanium nitride have the same degree of absorbance as TiN in a wavelength range for which the measurement was carried out.

Thus, the composite particles of titanium nitride have excellent oxidation resistance and exhibit a small change in color tone. In addition, the composite particles of titanium nitride have the same degree of absorbance as TiN.

The absorbance is a value determined as follows: The composite particles of titanium nitride are dispersed in water with ultrasonic waves, and the transmittance measured with an ultraviolet-visible spectrophotometer is used to obtain the absorbance.

In FIG. 3, TiN of "standard" is the one produced under standard conditions and has the stoichiometric composition of TiN. TiN of "LowO$_2$" is the one produced in a more reducing atmosphere and contains almost no oxygen. The color thereof is bluish. TiN of "HighO$_2$" is the one produced in a slightly oxidizing atmosphere and contains some oxygen. The color is reddish.

The composite particles are usable for, for example, a black matrix of a liquid crystal display device, an organic EL display device, or the like. The composite particles are usable as a light blocking material. In this case, the composite particles are usable as a light blocking material for a color filter and a light blocking material provided on the side of a thin film transistor which receives outside light.

The composite particles are usable also for printing ink, inkjet ink, a material for producing a photomask, a material for producing a proof for printing, etching resist, and solder resist.

Besides, the composite particles can be used for a catalyst support for example, and in this case, the performance of the catalyst can be enhanced since the particle size can be decreased.

The composite particles are usable also for a photoelectric conversion element and a photothermal conversion element.

The composite particles can be mixed with metal, oxide, plastic or other materials for use as, for instance, a pigment for adjusting the color tone.

Aside from that, the composite particles can be utilized in production of sintered bodies for use as electrical insulation materials for semiconductor substrates, printed circuit boards and various electrical insulation parts, materials for high-hardness and high-precision machining tools such as cutting tools, dies and bearings, functional materials for grain boundary capacitors and humidity sensors, and precision sinter molding materials, production of thermal sprayed parts such as engine valves made of materials that are required to be wear-resistant at a high temperature, and production of electrode or electrolyte materials and various catalysts for fuel cells.

In this embodiment, nitride fine particles can be formed to have a nanosize, and therefore, use of those particles for, for example, a sintered body makes it possible to enhance the sintering properties, so that a sintered body with high strength can be obtained. As a result, for instance, a tool having excellent cutting properties can be obtained.

The present invention is basically configured as above. While the composite particles and the method of producing the composite particles according to the invention have been described above in detail, the invention is by no means limited to the foregoing embodiment and it should be understood that various improvements and modifications are possible without departing from the scope and spirit of the invention.

REFERENCE SIGNS LIST 10 fine particle production apparatus
12 plasma torch
14 material supply device
15 primary fine particle
16 chamber
18 fine particle (secondary fine particle)
19 cyclone
20 collecting section
22 plasma gas supply source
24 thermal plasma flame
28 gas supply device
30 vacuum pump

The invention claimed is:

1. Composite particles, comprising TiN combined with Al in each particle,
wherein the composite particles have a particle size of 1 to 100 nm,
wherein a content of Al is 0.1 to 20 mass %, and
wherein the content of Al is represented by a percentage by mass of Al when contents (mass %) of elements other than Ti and Al are omitted from contents (mass %) of all elements measured by X-ray fluorescence spectrometry and a total percentage by mass of Ti and Al are defined as 100.

2. Composite particles, comprising TiN combined with Cr in each particle,
wherein the composite particles have a particle size of 1 to 100 nm,
wherein a content of Cr is 0.1 to 20 mass %, and
wherein the content of Cr is represented by a percentage by mass of Cr when contents (mass %) of elements other than Ti and Cr are omitted from contents (mass %) of all elements measured by X-ray fluorescence spectrometry and a total percentage by mass of Ti and Cr are defined as 100.

3. Composite particles, comprising TiN combined with the Nb,
wherein the composite particles have a particle size of 1 to 100 nm,
wherein a content of Nb is 0.1 to 20 mass %, and
wherein the content of Nb is represented by a percentage by mass of Nb when contents (mass %) of elements other than Ti and Nb are omitted from contents (mass %) of all elements measured by X-ray fluorescence spectrometry and a total percentage by mass of Ti and Nb are defined as 100.

4. A method of producing composite particles comprising TiN combined with at least one of Al, Cr and Nb in each particle,
wherein the composite particles are produced using powder of titanium and powder of at least one of Al, Cr and Nb as a feedstock by means of a thermal plasma process,
wherein the thermal plasma process comprises a step of supplying carrier gas having a feedstock dispersed therein to a thermal plasma flame and a step of supplying cooling gas to a terminating portion of the thermal plasma flame to thereby produce the composite particles, and
wherein at least one of a plasma gas and the cooling gas comprises nitrogen.

5. The method of producing composite particles according to claim 4, wherein the thermal plasma flame is derived from at least one of argon gas and nitrogen gas.

* * * * *